United States Patent [19]

Parise et al.

[11] 4,316,600
[45] Feb. 23, 1982

[54] FAST ACTING, NONREPAIRABLE PLASTIC ON/OFF VALVE

[75] Inventors: Carl Parise; Rainer R. Schulz, both of Sparks, Nev.

[73] Assignee: Parise & Sons, Inc., Sparks, Nev.

[21] Appl. No.: 156,240

[22] Filed: Jun. 4, 1980

[51] Int. Cl.[3] ............................................. F16K 1/34
[52] U.S. Cl. .................................. 251/245; 251/333; 251/DIG. 1; 251/321
[58] Field of Search ................. 251/321, 333, DIG. 1, 251/245, 244, 246

[56] References Cited

U.S. PATENT DOCUMENTS

| | | | |
|---|---|---|---|
| 1,184,365 | 5/1916 | Luhrs | 251/239 |
| 2,083,584 | 6/1937 | Wineman | 251/333 X |
| 3,195,566 | 7/1965 | Cornelius | 251/245 X |
| 3,253,788 | 5/1966 | McHugh et al. | 251/321 X |
| 3,480,035 | 11/1969 | Szanto | 251/333 X |
| 3,539,151 | 11/1970 | Reid | 251/244 X |
| 4,009,728 | 3/1977 | Parise | 137/594 |
| 4,014,510 | 3/1977 | Smith | 251/DIG. 1 |

Primary Examiner—Arnold Rosenthal
Attorney, Agent, or Firm—Sughrue, Mion, Zinn, Macpeak & Seas

[57] ABSTRACT

A fast acting on/off valve formed of molded plastic components includes a molded plastic body bearing offset inlet and outlet passages which extend from opposite ends through integral nipples to a common area, with communication effected by way of a bore and counterbore for respective outlet and inlet passage portions. The end of the bore, at a shoulder formed between the bore and counterbore, is chamfered. A spool type plunger having lands at opposite ends is mounted within the counterbore and bore with one land sized to the bore and the other being sized to the counterbore, that land having a conical inside face at an angle corresponding to the chamfer. A coil spring is compressed between the larger diameter land end of the plunger and a cap which is welded to the valve body and closes off the counterbore, the spring biasing the spool type plunger to valve closed position. An O-ring of an outside diameter larger than the counterbore is borne by the counterbore and rests on the shoulder and effects a high integrity seal and valve seat for the tapered plunger land face. A smaller diameter O-ring is borne within a peripheral recess on the small diameter land to effect sealing of the plunger to the bore and cooperates with the larger diameter O-ring for double sealing during valve closure. A U-shaped actuator handle is formed of plastic and is snap fitted to the valve body with raised sidewalls protecting the inlet nozzle and the hose connection thereto.

7 Claims, 7 Drawing Figures

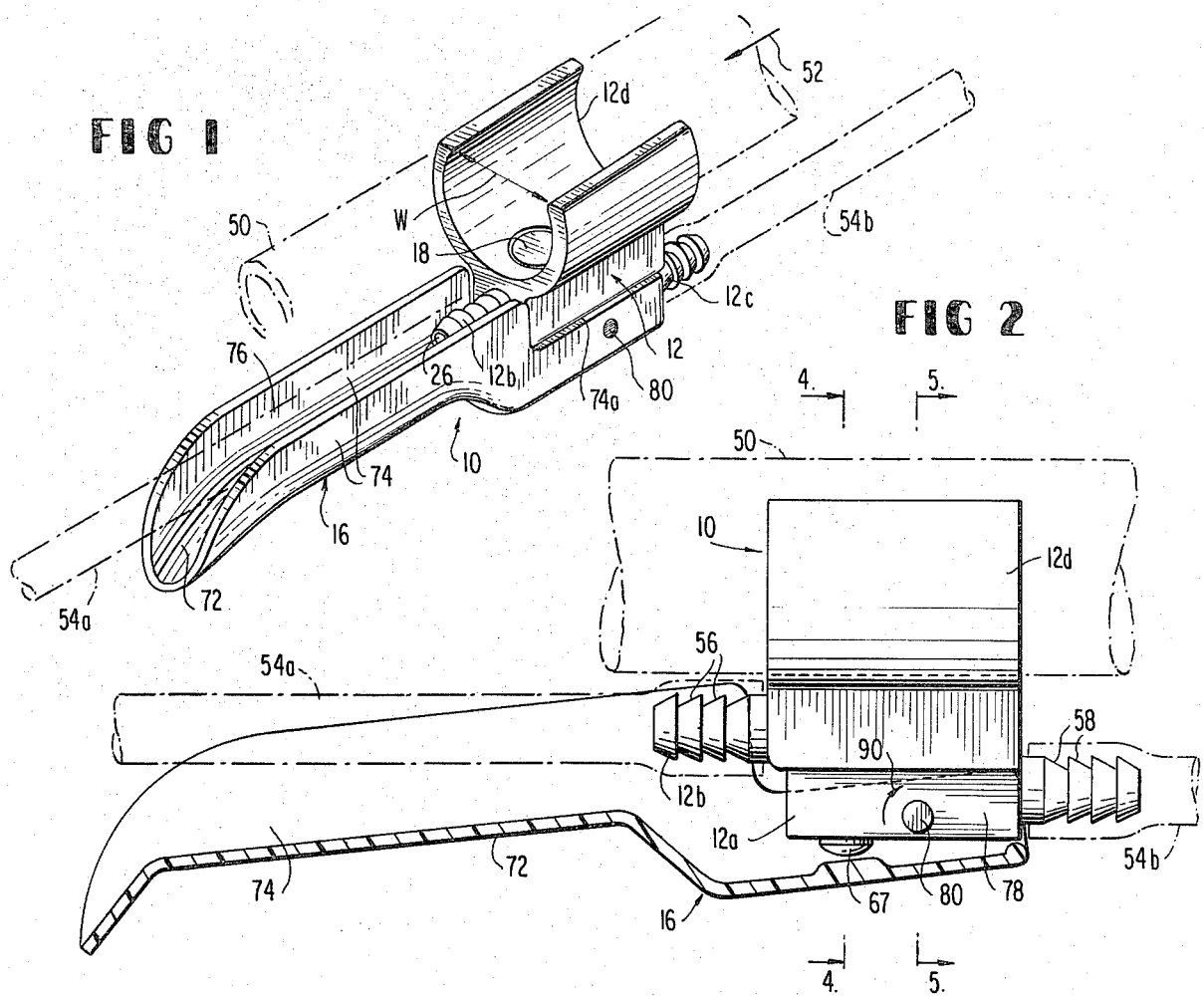
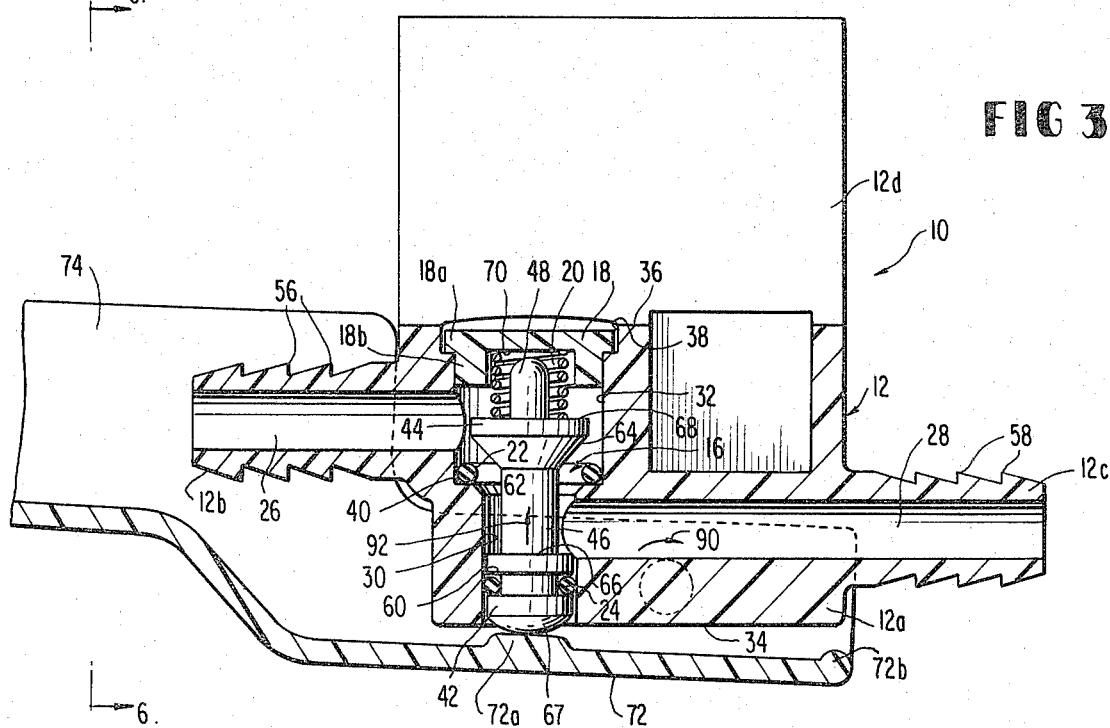

FAST ACTING, NONREPAIRABLE PLASTIC ON/OFF VALVE

FIELD OF THE INVENTION

This invention relates to on/off valves for controlling the flow of liquid or gaseous fluid and, more particularly, to a fast acting water or air on/off valve with minimal pressure loss across the valve seat area during valve open position.

BACKGROUND OF THE INVENTION

Pivotable handle actuated fluid valves have been in existence for some time in which a slideable valve plunger is spring biased so as to project against a pivotable handle carried by the valve body to maintain the valve closed and to prevent fluid connection between a pressure fluid supplied to an inlet passage which is parallel to but offset from an outlet passage within the valve body. The axially displaceable plunger functions to selectively fluid communicate the inlet passage to the outlet passage of the valve structure. Such valve structures have been typically formed of metal. U.S. Pat. No. 1,184,365 to Luhrs shows such a valve structure which incorporates a transverse or right angle communication passage between the offset inlet and outlet passages as comprised of a bore and counterbore which bear a plunger having a land or enlarged peripheral portion within the counterbore which functions as the movable valve member and which seats against a radial shoulder leading to the bore, within which is slidably mounted the smaller diameter portion of the plunger. Further, the Luhrs patent shows a coil spring, having one end which which fits within a central recess within the interior face of a cap which is threaded to the body at the end of the counterbore and the other end abutting the plunger. The compressed coil spring functions to bias the slidable plunger to valve closed position. Further, the end of the smaller diameter portion of the plunger projects from the bore to contact a spring biased actuator which is pivoted to the valve body and which may be grasped and pivoted to force the plunger, against the bias of the spring, to shift to an axially displaced position where the large diameter land unseats from the valve seat and permits fluid flow from the inlet passage to the outlet passage.

In addition to the formation of air and liquid valves of components of cast or machined metal, attempts have been made to form valve structures where at least the valve body is formed of a molded plastic as evidenced by U.S. Pat. No. 3,539,151 to Reid et al. While the incorporation of plastic molded components has to some extent reduced the number of components and has resulted in a somewhat simplified valve structure, there are no valve structures known to applicants in which all of the components except the biasing spring and seal elements are formed of molded plastic, and wherein the complexity and overall size of the valve have been substantially reduced, in comparison with metal on/off valve assemblies.

Within the last decade, there has developed a hot water vacuum extraction cleaning machine which has found appreciable consumer acceptance particularly for the home or household cleaning of wall-to-wall rugs or the like. Such a hot water vacuum extraction machine, as exemplified by the products of the assignee of this application, comprises a casing structure bearing a tank where water may be heated for supply to a spray nozzle mounted on a vacuum pick up head, which in turn is fixed to the end of a vacuum return wand for the steam cleaner. The water supplied by the hot water supply tank is sprayed onto the surface such as the rug to be cleaned adjacent to the vacuum pick up head. The vacuum return wand normally constitutes a light weight plastic or aluminum tube held by the operator and the vacuum head at the end of the tube is moved over the surface to be cleaned. By vacuum pressure application to a dump tank connected to the wand, the liquid after cleaning of the rug surface adjacent to the mouth of the vacuum head is picked up by the head and returned through the head and wand to the dump tank where the water is separated from the air employed in the vacuum pick up. Upon accumulation of a sufficient volume of dirty water in the dump tank, the dump tank is removed from the unit and the accumulated water is dumped.

In order to control the spray of hot water through the nozzle, there is normally provided within the hot water line or hose leading from the hot water tank to the spray nozzle, a spring biased on/off valve including a handle type valve operator or actuator. The actuator handle is grasped by the operator and is pivoted so as to depress a valve plunger and permit the fluid connection between the inlet and outlet passages of the valve. Additionally, the valve is clamped to the vacuum return wand and serves as the means for physically mounting a portion of the water supply hose to the wand at one end, the opposite end of the water supply line bearing the spray nozzle being mounted to one face of the vacuum pick up head.

U.S. Pat. No. 4,009,728 issuing Mar. 1, 1977 and assigned to the common assignee, is exemplary of a water valve assembly to which the present invention constitutes and improvement. In that patent the water valve assembly is mounted to the vacuum return wand of the hot water vacuum extraction machine or steam cleaner and includes a water valve of the type having an outwardly biased actuating member which prevents the passage of water in its normal position and permits the passage of water when pressed inwardly. The assembly comprises two mating mounting brackets shaped to receive portions of the periphery of the vacuum return wand and the water valve with a shaft passing through the mounting bracket between the vacuum return wand and the water valve and a lever arm mounted on the shaft in two mounting brackets and means for urging the two mounting brackets together so as to firmly grasp the vacuum return wand and the water valve therebetween. Such water valve assembly includes a number of separate components forming the mounting bracket and which are completely separate from the valve bearing the spring biased plunger or valve actuating member which normally prevents flow absent depression of the plunger between an axially aligned inlet and outlet passages within the valve body.

It is, therefore, a primary object of the present invention to provide an improved, fast acting, simplified on/off valve which is preferably formed of molded plastic components and which is preferably non-repairable, and wherein the valve is characterized by a double seal when in valve closed position with a highly effective resilient O-ring seal type valve seat contacting a conical valve plunger land.

SUMMARY OF THE INVENTION

A molded plastic component, fast acting on/off valve of the present invention comprises a molded plastic body including offset, parallel inlet and outlet passages extending from opposite ends thereof towards each other and terminating commonly in a transverse flow passage formed by aligned transverse bore and counterbore, with the inlet passage intersecting the counterbore and the outlet passage intersecting the bore and with the counterbore defining with the bore, a radial shoulder. The improvement comprises a spool type plunger including axially spaced first and second lands, said first land slidable within said bore and having a diameter of slightly less than the diameter of the bore. The second land has a diameter in excess of the bore but less than that of the counterbore and slidable in said counterbore and has a tapered conical valve contact face. Means are provided within said counterbore for biasing said spool valve plunger to valve closed position. Sealing means are carried by said first land for sealing said plunger to said bore to the side of said outlet passage remote from said second land. A cap carried by said body seals off the end of said counterbore at the side of said inlet passage remote from said valve seat. An O-ring of a diameter in excess of the diameter of said counterbore is mounted within said counterbore adjacent said shoulder such that closure of said valve causes said conical valve contact face to seat on said O-ring and to compress said O-ring to form a high integrity O-ring valve seat seal during valve closing, and to form a double seal with said sealing means of said one land.

The spool type valve plunger preferably comprises a peripheral recess within the periphery of said first land, and an O-ring having a diameter slightly in excess of the diameter of the bore is carried within the first land peripheral recess to provide a high integrity seal between the plunger first land and the valve body when the valve is in valve open position and said conical valve contact face other land is spaced from said O-ring seal valve seat. Preferably, the valve body comprises integral inlet and outlet nipples projecting away from opposite ends of the valve body. A molded plastic actuator handle of U-shaped cross-section is snap fitted to the sides of said valve body for pivoting about an axis at right angles to the axes of the parallel inlet and outlet passages and includes a base portion underlying the valve plunger. The valve plunger includes an end projecting outwardly of the valve body and in contact with the base portion of the U-shaped molded plastic actuator handle. Preferably, the valve body is recessed at its sides. The U-shaped molded plastic actuator handle has side walls which are of width approximately equal to the width of the valve body recesses. The handle side walls bear aligned holes. The valve body recesses to receive respective side walls of the U-shaped actuator handle. Bosses project outwardly from the recessed portions of said valve body sides of a diameter corresponding to the holes within the sides of said U-shaped molded plastic actuator handle, and said handle is snap fitted to the bosses with the bosses projecting within the aligned holes. The bosses define a pivot axis for the molded plastic actuator handle.

The bosses may have inclined end faces which taper upwardly and outwardly to form cams and the inner faces of the sidewalls of said U-shaped actuator handle above the aligned holes may taper downwardly and inwardly to form cam follower surfaces to facilitate the snap fit pivotable mounting of said molded plastic actuator handle to said valve body. The base portion of said U-shaped handle may have a raised circular projection corresponding in diameter to the bore and facing said bore so as to contact the projecting end of said valve body to facilitate axial shifting of said valve body against the biasing means. Further, the end of the U-shaped actuator handle to the side of the pivot axis remote from the plunger may be provided with a raised projection on the base facing the valve body to limit pivoting of the handle when the valve is in valve closed position to insure that the sides of the U-shaped actuator handle do not expose the valve inlet nipple and that portion of the hose which extends through the interior of the valve actuator handle leading to said inlet nipple during valve closed position.

BRIEF DESCRIPTION OF THE DRAWINGS

FIG. 1 is a perspective view of one embodiment of the fast acting on/off valve of the present invention, with the fluid inlet and outlet hoses and a wand for mounting the valve indicated in dotted lines.

FIG. 2 is a side elevational view, partially in section of the valve of FIG. 1.

FIG. 3 is a vertical sectional view of the valve of FIG. 2, in valve open position.

DESCRIPTION OF THE PREFERRED EMBODIMENT

Figure 4:
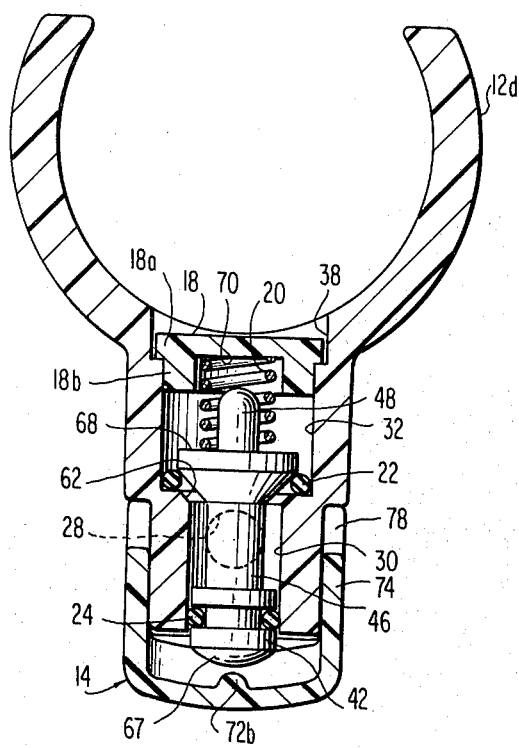
FIG. 4 is a vertical sectional veiw of the valve in FIG. 2, taken about line 4—4.

Referring to the drawings, there is shown a preferred embodiment of applicants' fast acting, non-repairable plastic on/off valve indicated generally at 10, the valve being comprised of several basic plastic parts including a molded plastic valve body indicated generally at 12, a molded plastic actuator handle indicated generally at 14, a molded plastic spool type valve member indicated generally at 16, and a molded plastic cap 18. In fact, the only non-plastic elements of the valve assembly comprises a metal coil spring 20, an O-ring seal valve seat member 22, and a plunger borne O-ring seal 24. The valve body 12 is unitary in form, and is molded to include a generally rectangular base 12a, an integral inlet nipple 12b, an integral outlet nipple 12c, the inlet nipple 12b projecting forwardly from one end of the valve body and the outlet nipple 12c projecting in the opposite direction from the opposite end of that body. Also integrally formed are an integral C-clamp indicated generally at 12d. In the molding process, the valve body 12 is provided with a longitudinally extending inlet passage as at 26 which extends axially through the inlet nipple 12b and which extends parallel to a second longitudinal, outlet passage 28 of equal diameter and which is offset with respect to the inlet passage 26. It is noted that the inlet and outlet passages extend from opposite ends, the outlet passage 28 projecting axially through the center of the outlet nipple 12c. However, these passages terminate in a plane which intersects both passages and which constitutes the axis for a right angle bore 30 and a counterbore 32 which open at the bottom 34 and top 36 respectively of the base portion 12a of valve body 12. The bore 30 and the counterbore 32 form a radial shoulder 40 at their plane of intersection, intermediate of the inlet and outlet passages 26 and 28. Further, the counterbore 32 is provided with a peripheral recess 38, where the counterbore 32 opens to the top 36 of the base portion 12a of the valve body. The spool type plunger 16 is cylindrical in form and provided with two axially spaced lands, a first small diameter land 42 which has a diameter slightly less than the diameter of bore 30 within which this land rides, and a second larger diameter land indicated at 44, the land being separated by a smaller diameter valve spool portion 46, having a diameter considerably less than the diameter of bore 30. Land 44 has a diameter which is in excess of bore 32 but is less than that of the counterbore 32 within which this land resides. The spool type valve plunger 16 terminates at its end within the counterbore 32 in an axial projection of relatively small diameter as at 48, which acts as a stop to prevent the spool valve from moving axially beyond a point where the end of the projection 48 contacts the plastic cap 18. The plastic cap 18 is generally T-shaped in cross-section and is provided with a peripheral flange or lip 18a having a diameter on the order of recess 38 within the valve body counterbore 32 and a reduced diameter portion or base 18b which closely matches the diameter of counterbore 32.

During assembly, the plunger 16 is positioned within the valve body bore and counterbore with spring 20 concentric to stop 48 and the cap 18 is thermally welded to the valve body base portion 12a to seal that end of the counterbore 34. This prevents any possible repair to the interior of the valve. However, the molded plastic valve structure is quite rugged and of simplified design to minimize problems and therefore requires no maintenance and which will serve many years of use without the need for replacement.

As may be appreciated by reference to FIGS. 1 and 2, the environment of use of the valve particularly envisioned by applicants is in conjunction with a hot water vacuum extraction machine and in which a vacuum wand includes, as an element thereof, a tube indicated generally at 50 in FIGS. 1 and 2 through which dirty water is picked up by vacuum application for return to the dump tank of the hot water vacuum extraction machine (not shown) as evidenced by arrow 52. Likewise, the valve is employed to permit hot water to flow from the hot water tank of the vacuum extraction machine to a spray nozzle, neither of which elements are shown, by way of a supply hose leading from the hot water tank to the nozzle, the supply hose being broken and comprised of an inlet side section 54a which is coupled to the inlet nipple 26 and having its end forced onto the serrations 56 on the periphery of that inlet nozzle. Likewise, the outlet side 54b of the hot water hose is coupled at one end to the outlet nipple 12c by expanding the hose and forcing it over the serrations 58 functioning as barbs and gripping the expanded hose at this point, as clearly seen in FIG. 2 in dotted line fashion. The C-clamp 12d constitutes an integral C-shaped member which is open at the top, and which preferably has a width W which is slightly less than the diameter of the vacuum wand tube 50 in which case the plastic arms of the C-clamp 12d may be spread to force the clamp to permit the wand to fall between the clamp arms and to be frictionally grasped thereby to form a stable mount to the vacuum wand tube 50. In fact, advantageously, the resilient plastic making up the valve components permits the valve, once assembled, to be mounted readily to the vacuum wand and also permits the actuator handle 14 to be snap fitted to the valve body as will be described in detail hereinafter.

Of particular interest to the present invention is the make up of the spool type valve plunger and the highly effective double seal arrangement for that plunger during valve closed condition, which conditions exist for the major portion of the operational time for the hot water vacuum extraction machine to which the valve has particular application. In this respect, the small diameter first land 42 is provided with a central peripheral recess 60 to a depth which is slightly less than the diameter of the O-ring seal 24, which is borne within the peripheral recess 60 and which effects a positive seal between bore 30 of the valve body 12 and plunger 16 adjacent the outlet passage 28 for the valve. Further, the design of the valve is enhanced by the creation of a conical surface or chamfer as at 62, created by chamfering the end of bore 30, at shoulder 40. The conical surface 62 faces a conical valve contact face 64 of the second land 44, the conical valve contact face 64 contrasting to the right angle face 66 of the first land 42 at the opposite end of the reduced diameter portion 46 of the spool type valve plunger 16. The angle of inclination for the conical valve contact face 64 matches that of chamfer or surface 62.

As an important aspect of the present invention, there is provided within counterbore 32, a second O-ring seal member 22 having an internal diameter which is greater than the diameter of the bore 30 and an external diameter which may be slightly greater than that of counterbore 32. Further, the internal diameter of the O-ring seal 22 is less than the diameter of the second land 44, so that this seal member cannot ride to the opposite side of land 44 conical valve contact face 64. When the valve plunger 16 moves to the valve closing position, FIG. 4, it may be seen that valve closure is completed and sealing is enhanced because the conical valve contact fact 64 compresses the O-ring seal valve seat 22. Normally, there is no contact between tapered surface 62 and the portion of the conical valve contact face 64 beneath the contact area of that face and the O-ring 22. The coil spring 20 concentrically surrounds the projection or stop 48, has one end in contact with end face 68 of valve plunger 16 and the opposite end contacting the bottom of a central circular recess 70 within end cap 18.

As may be appreciated further by viewing FIG. 4, when the valve is in the valve closed position, there is a double seal for the preventing escape of pressurized fluid from bore 30 this being effected by the presence of the two O-rings 22 and 24. With the conical valve face 64 compressing the O-ring seal valve seat 22 for the spool valve, fluid no longer flows from the inlet passage 26 to the outlet passage 28, the primary function of the O-ring seal 22 within the first land 42 is to insure sealability of the valve structure during valve open position of the spool member 16, FIG. 3.

As a further aspect of this invention, the valve actuator handle 14 is not only formed of molded plastic, but is snap fitted to the valve body base 12. Pivotable movement of the valve actuator handle 14 causes controlled opening of the valve by axial displacement of the valve plunger 16 against the compression spring 20. Handle 14 also provides a protective cover for the connection between the inlet side hose 54a and the inlet nipple 12b.

Figure 5:
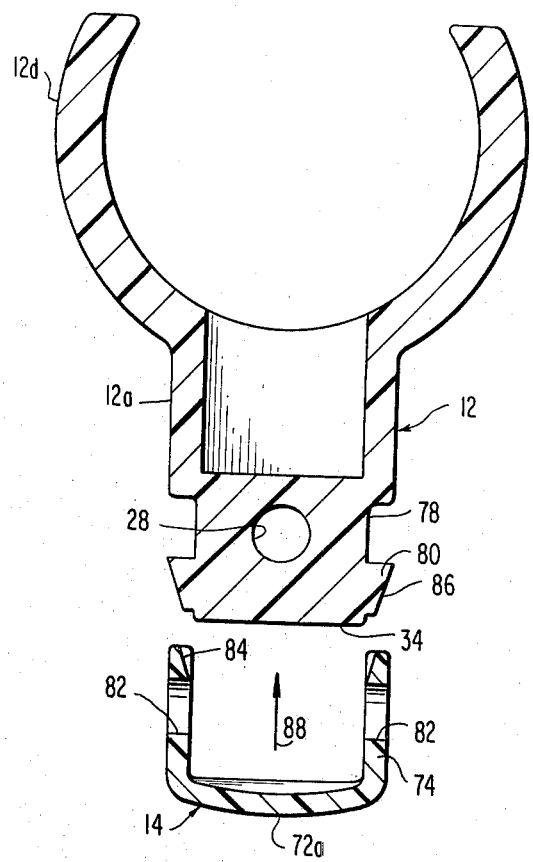
FIG. 5 is an exploded, vertical sectional view of a portion of the valve of FIG. 2, taken about line 5—5.
Figure 6:
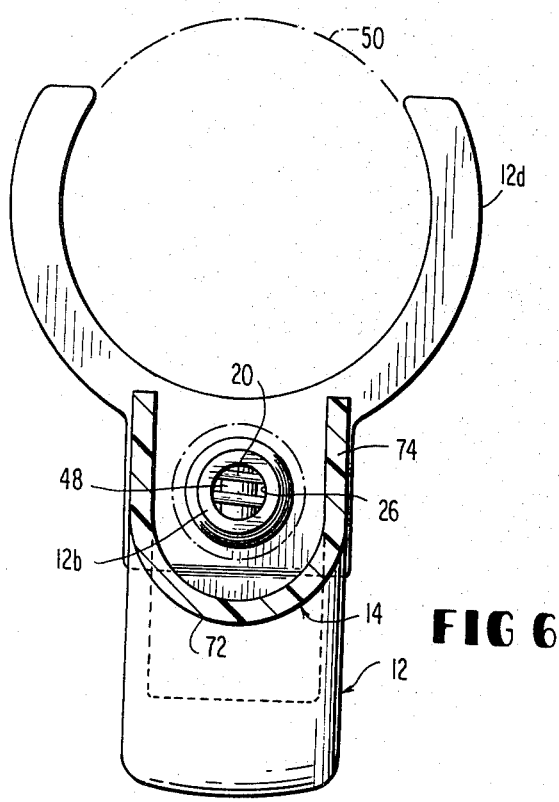
FIG. 6 is a vertical sectional view of the valve of FIG. 3, taken about line 6—6.
Figure 5A:
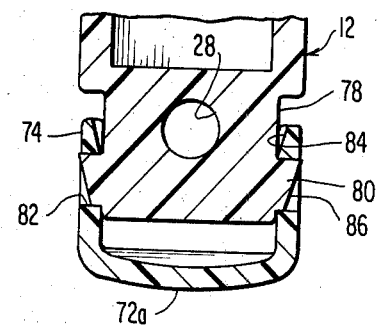
FIG. 5a is a partial sectional view of a portion of the valve shown in FIG. 5 with the actuator handle snap coupled to the valve body.

Referring to the drawings, it can be ascertained that the valve actuator handle 14 is essentially of U-shape in transverse cross-section including a base 72 and integral opposed side walls 74. At some point beyond the end of the valve body base 12a bearing the inlet nipple 12b, the valve actuator handle 14 is offset while retaining its U-shaped transverse cross-section to define an upwardly facing trough indicated generally at 76 within which extends the inlet side hose 54a coupled to the inlet nipple 12b. At the valve body proper, the sidewalls 74 are relieved to form recesses as at 74a which are of generally rectangular configuration and extend essentially the full length of the valve body base 12a. Further, the valve body base 12a is provided with longitudinal recesses 78 on opposite sides thereof from bottom 34 upwardly corresponding to the height of the sidewalls 74 in the vicinity of their recess 74a. Integrally formed within the valve body base 12a at recesses 78 are projecting bosses 80 which are circular and project from opposite sides thereof. The side walls 74 of the U-shaped valve actuator handle 14 bear aligned circular openings or holes 82 of the diameter slightly in excess of the diameter of bosses 80. Above holes 82, the inside surfaces of the side walls 74 of the U-shaped actuator handle 14 are tapered downwardly and inwardly from their upper edge as at 84 to form cam followers to permit snap fitting of the valve actuator handle 14 to the valve body base 12a. Further, the end faces 86 of the bosses 80 are inclined or tapered downwardly and inwardly forming cams to mate with the cam followers 84 and to facilitate the spreading of the sidewalls 74 of the U-shaped valve actuator handle 14 and to permit when the handle is moved in the direction of the arrow 88, FIG. 5, the sidewall to flex outwardly away from each other, causing the handle 14 to be snap fitted to the bosses at holes 82 as evidenced by the sequence of FIGS. 5, 5a.

The compression spring 20 provides sufficient biasing force to force the plunger 16 into the valve closed position shown in FIG. 4. Additionally, the inlet pressure of the fluid within the counterbore 34 and acting on the valve plunger 16 aids the coil spring 20 in maintaining the valve in its normal closed position absent pivoting of the valve actuator handle in a clockwise direction, as indicated by arrow 90, FIGS. 2 and 3, about the pivot axis as defined by bosses 80.

In order to facilitate depression of the valve plunger 16 axially in the direction of arrow 92, FIG. 3, and movement of the valve plunger 16 to valve open position, contact between that plunger and the valve actuator handle is enhanced by two provisions. First, preferably the length of plunger 16 is such that the end face 67 of land 42 normally projects some distance below the bottom 36 of the valve body base 12a. Further, the end face 67 of that land 42 is given a spherical configuration so that contact between the valve handle actuator and the valve plunger 16 is essentially point contact, and thirdly, the base 72 of the valve actuator handle 14 is provided with a raised contact or circular projection 72a of a diameter on the order bore 30 which rides on the spherical end face 67 of the valve plunger, to permit the forces to act essentially axially on the valve plunger during its displacement upwardly against the bias of spring 20 as evidenced by arrow 92, FIG. 3.

In order to insure that the valve plunger 16 can close with no problem, there is provided an approximately three times over travel for the plunger in terms of its travel distance necessary to move from full closed to full open position. With the diameter of the connecting portion 46 acting to prevent equal liquid or air supply pressure from being exerted on opposite sides of the second land 44, there is always a closing force exerted by the coil spring 20 and fluid pressure on face 68 of the valve spool sufficient to insure self closing under either non-pressurized or unpressurized conditions. If the valve in unrestricted at the outlet pressurewise, the spring 20 causes initial downward movement of the valve plunger 16 until the conical valve contact face 64 comes into contact with the O-ring seal valve seat 22 for plunger 16. Positive fluid pressure on the intake or inlet side of the valve then acts as mentioned previously with the spring 20 to assure a positive seal. Further, at higher back pressure within outlet passage 20, the fluid force acting against the small O-ring seal 24 provides a force which acts in conjunction with the biasing spring 20 which also assists that spring in closing the valve. This assures rapid and positive closing of the valve under all conditions, particularly those when back pressure is exerted on the valve plunger through the outlet passage 28 to the area intermediate of lands 42 and 44 within bore 30.

As may be appreciated by reference to FIG. 2, when the valve is in valve closed position, the valve actuator handle 14 pivots to a position where the raised projection 72a is in fact out of contact with the spherical end 67 of the valve plunger or spool. Additional further pivoting is prevented, in this case, by the incorporation of a bead 72b within the interior upper face of the valve actuator handle base 72 at the end, to the side of the pivot axis as defined by boss 80 opposite that underlying the valve plunger 16. This prevents pivoting of the handle to the point where it is essentially uncovered. The inlet hose portion 54a or and particularly at the point where it connects to the inlet nipple 12b.

As mentioned previously, the valve has application to controlled delivery of either a liquid or gas under pressure. Further, if a hot gas or hot water is supplied to the inlet side of the valve, the U-shaped actuator handle not only hides the hose connection, but provides a heat guard to prevent the operator contact with the hot hose 54a or like conduit carrying the hot fluid to the valve 10. In an exemplary valve, the plunger 16 travels from fully closed to fully open position was designed to be 0.25 inches with 0.075 inches of overtravel. The valve provided a fast acting water/air on/off valve with low pressure loss across it. There is a measurable one psi pressure drop across the valve with a 15 psi input, at a flow rate of one-half gpm.

While the invention has been particularly shown and described with reference to a preferred embodiment thereof, it will be understood by those skilled in the art that various changes in form and details may be made therein without departing from the spirit and scope of the invention.

What is claimed is:
1. A fast acting on/off valve comprising:
   a molded plastic valve body, said including offset, parallel inlet and outlet passages extending partially through said body from opposite ends thereof,
   a transverse flow passage intersecting said parallel inlet and outlet passages, said transverse flow passage passing through said valve body and being comprised of a bore intersecting said outlet passage and a counterbore intersecting said inlet passage, with said counterbore defining with said bore a radial shoulder intermediate of said inlet and outlet passages, a spring biased valve plunger slidably mounted within said bore and including a portion closing off said bore and said counterbore at said radial shoulder, the improvement wherein:

said valve plunger comprises a spool type valve member including a first land at one end thereof slidably and sealably mounted within said bore and partially projectable externally of said valve body and a second land at the opposite end thereof having a diameter in excess of the diameter of said bore but less than the diameter of said counterbore and including a conical valve contact face on the side facing said first land, an O-ring seal valve seat positioned within said counterbore against said radial shoulder and engageable by said conical valve contact face of said second land to provide a high integrity seal between said inlet and said outlet passages when said valve plunger is in said valve closed position under the spring bias of said biasing means and under the pressure of the fluid in said inlet passage, the edge of said bore at the radial shoulder being chamfered to form a conical surface at the same angle as the conical valve contact face of said second land, and wherein said first land comprises a peripheral recess, and said peripheral recess bears an O-ring sealing member whose outer diameter is slightly in excess of the diameter of said bore, and said O-ring sealing member is of a thickness in excess of the depth of said peripheral recess so as to provide a high pressure resilient seal between said valve plunger and said bore.

2. The fast acting on/off valve as claimed in claim 1, wherein said molded valve body further comprises integral inlet and outlet nipples projecting away from opposite ends of said valve body and bearing respectively said inlet and said outlet passages and further comprising a molded plastic actuator handle of U-shaped crosssection, means for snap fitting said handle to said valve body for pivoting about an axis at right angles to the axis of said parallel inlet and said outlet passages, and said handle including a base portion underlying said valve plunger for contact with the projecting end of said valve plunger to press said valve plunger towards valve opening position and off said valve seat in opposition to said biasing spring.

3. The fast acting on/off valve as claimed in claim 2, wherein said valve body is recessed on opposite sides thereof, said U-shaped molded plastic actuator handle has opposed side walls which are spaced a distance apart approximately equal to the width of the recessed portion of the valve body, said handle side walls include a pair of laterally aligned holes and said valve body recesses include circular bosses projecting outwardly thereof on opposite sides thereof and being of a diameter slightly less than that of the holes and wherein said handle is snap fitted to said bosses by sliding the side walls of said U-shaped actuator handle onto said recessed sides of said valve body until said bosses project within said aligned holes such that said U-shaped actuator handle may pivot about a pivot axis defined by said bosses.

4. The fast acting on/off valve as claimed in claim 3, wherein the interior of said sidewall of said U-shaped actuator handle from the ends of said sidewalls to said circular hole are inclined downwardly and inwardly to form cam followers, and wherein the end faces said bosses are correspondingly inclined to form cam surfaces to facilitate flexure of the side walls of said U-shaped actuator handle and snap fitting onto said bosses.

5. The fast acting on/off valve as claimed in claim 4, wherein the U-shaped actuator handle includes a transverse base portion spanning said transversely spaced side walls, and includes a circular projection on the surface thereof facing said base, and wherein the projecting end of said valve plunger facing said base portion circular projection is spherical to facilitate axial displacement of said valve plunger during pivoting of said U-shaped actuator handle and contact between said circular projection and said valve plunger spherical projecting end.

6. The fast acting on/off valve as claimed in claim 5, wherein said plunger and said U-shaped actuator handle are formed of molded plastic, and wherein said counterbore terminates in an annular recess on the side of said valve body opposite said U-shaped actuator handle and a circular cap T-shaped in crosssectional configuration having a flanged periphery seated to said recess of said counterbore, and a base closely fitted with said counterbore is welded thereto to seal said counterbore at the end thereof opposite said O-ring valve seat, and a coil spring compressed between said cap and said valve plunger constitutes said spring for biasing said valve plunger to valve closed position.

7. The fast acting on/off valve as claimed in claim 6, wherein said valve body comprises an integral C-shaped clamp projecting from the side of said valve opposite that bearing said pivotable U-shaped actuator handle, said C-shaped clamp having arms defining an open slot of a diameter slightly less than the diameter of a tubular element to be coupled thereto, whereby said plastic clamp is forcibly expanded to permit entry of and frictional gripping by said clamp to said tubular body for mounting of said valve.

* * * * *